US008621308B2

(12) United States Patent
Rao

(10) Patent No.: US 8,621,308 B2
(45) Date of Patent: Dec. 31, 2013

(54) HARQ OPERATING POINT ADAPTATION IN COMMUNICATIONS

(75) Inventor: Anil M Rao, Wheaton, IL (US)

(73) Assignee: Alcatel Lucent, Paris (FR)

( * ) Notice: Subject to any disclaimer, the term of this patent is extended or adjusted under 35 U.S.C. 154(b) by 579 days.

(21) Appl. No.: 12/827,516

(22) Filed: Jun. 30, 2010

(65) Prior Publication Data

US 2012/0005548 A1 Jan. 5, 2012

(51) Int. Cl.
*H04L 1/18* (2006.01)
*G06F 11/00* (2006.01)

(52) U.S. Cl.
USPC .......................................... 714/748; 714/704

(58) Field of Classification Search
None
See application file for complete search history.

(56) References Cited

U.S. PATENT DOCUMENTS

| 7,661,038 | B2* | 2/2010 | Li et al. ........................... 714/704 |
| 8,116,267 | B2* | 2/2012 | Van Rensburg et al. ...... 370/329 |
| 2002/0186761 | A1* | 12/2002 | Corbaton et al. .............. 375/231 |
| 2003/0067907 | A1* | 4/2003 | Rezaiifar et al. ............... 370/349 |
| 2007/0195809 | A1* | 8/2007 | Blanz et al. .................... 370/426 |
| 2007/0238430 | A1* | 10/2007 | Himayat et al. ........... 455/226.3 |
| 2007/0297522 | A1 | 12/2007 | Baggen et al. |
| 2008/0220806 | A1* | 9/2008 | Shin et al. ...................... 455/522 |
| 2009/0168711 | A1* | 7/2009 | Fukuoka et al. ............... 370/329 |
| 2010/0177653 | A1* | 7/2010 | Luo et al. ....................... 370/252 |
| 2010/0284454 | A1* | 11/2010 | Oteri et al. ..................... 375/224 |
| 2011/0300849 | A1* | 12/2011 | Chan .......................... 455/422.1 |

FOREIGN PATENT DOCUMENTS

| EP | 1783943 | 5/2007 |
| EP | 1990942 | 11/2008 |

OTHER PUBLICATIONS

PCT/US2011/042091 International Search Report and the Written Opinion of the nternational Searching Authority, or the Declaration dated Feb. 9, 2012.

* cited by examiner

*Primary Examiner* — Daniel McMahon
(74) *Attorney, Agent, or Firm* — J. K. Jacobs

(57) ABSTRACT

Various embodiments are provided to address some of the current issues in establishing and adapting an HARQ operating point. Some embodiments include determining a metric that indicates the predictability of a signal to noise plus interference ratio (SINR) for signaling from a wireless device and setting a hybrid automatic repeat request (HARQ) operating point for communication with the wireless device using the metric. By setting the HARQ operating point based on a metric that indicates the predictability of SINR for wireless device signaling, throughput can be improved over present-day HARQ operating point adaptation techniques.

11 Claims, 6 Drawing Sheets

HARQ OPERATING POINT ADAPTATION IN COMMUNICATIONS

FIELD OF THE INVENTION

The present invention relates generally to communications and, in particular, to HARQ operating point adaptation in communications.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

While 3G technologies such as HSPA and EV-DO based on CDMA introduced channel aware scheduling on the downlink in order to improve spectral efficiency, the CDMA nature of these technologies required fast power control on the uplink and hence channel aware scheduling was not possible. 3GPP LTE, which is based on OFDM, no longer requires fast power control on the uplink, and introduced a sounding reference signal (SRS) which makes channel aware scheduling on the uplink possible.

In order to fully exploit the channel aware scheduling capabilities of the LTE uplink, one must configure the system with the proper hybrid automatic repeat request (HARQ) operating point, which controls the rate at which retransmissions occur. The general philosophy at present is to target a low retransmission rate when the Doppler is low (i.e., the level of mobility is low) and target a higher retransmission rate when the Doppler is high (i.e., the level of mobility is high).

More generally, the setting of the HARQ operating point depends on the predictability of the channel state; that is, how accurate the base station scheduler's estimate of the mobile's channel state is when it decides to schedule the mobile compared to the actual channel state when the mobile finally transmits data. This is impacted by several factors such as the Doppler of the mobile (which depends on the mobile speed and carrier frequency), the period at which the SRS is configured to be transmitted, and the burstiness of the other cell interference.

Existing techniques to choose the proper HARQ operating point typically depend only on a speed or Doppler estimate. The Doppler is related to the mobile speed through the relationship:

$$\Delta = \frac{fv}{c},$$

where f is the carrier frequency in Hz, v is the velocity of the mobile in meters per second, and c is the speed of light in meters per second. By using the Doppler instead of the mobile speed, the carrier frequency is automatically taken into account. This technique relies on an accurate estimate of either the mobile speed or of the Doppler directly. In addition, the thresholds chosen in order to determine which HARQ operating point to use for a given mobile speed will be based on the rate at which channel state information is made available to the base station scheduler; in the LTE uplink, this is the period at which the sounding reference signal (SRS) is configured to be transmitted by the mobile. The 3GPP specification allows the SRS to be transmitted as fast as every 2 ms and as slow as every 320 ms.

There are two basic problems with the existing techniques. First, the mobile speed or Doppler alone is not the only factor which leads to the predictability of the channel state. Proper rate selection by the base station scheduler requires an accurate estimate of the signal to noise plus interference ratio (SINR). While mobile speed or Doppler is indicative of the predictability of the signal power, it does not give any indication as to the variability in the interference. Due to the narrowband scheduling capability of the LTE uplink, the variability in interference generated by mobiles in other cells can potentially be quite large, and this is not predictable by the base station scheduler, and hence choosing an HARQ operating point based on low mobile speed or Doppler alone would not be appropriate.

Second, the SRS period that is configured will depend on the number of active users which are connected; this is due to the fact that only 16 users at most can transmit in one SRS transmission opportunity according to the 3GPP LTE specification. Therefore, when a very large number of active users are present, the SRS period must be increased in order to accommodate the larger user count, and further, different users may be configured with different SRS periods. This means an appropriate HARQ operating point must be selected for each of the possible SRS periods and possible mobile speeds. As the 3GPP specification matures and different SRS periods are added, the base station software must be updated to include the appropriate HARQ operating point for this SRS period.

Thus, new mechanisms and techniques that are able to address some of the current issues in establishing and adapting an HARQ operating point would advance communications generally.

Figure 1:
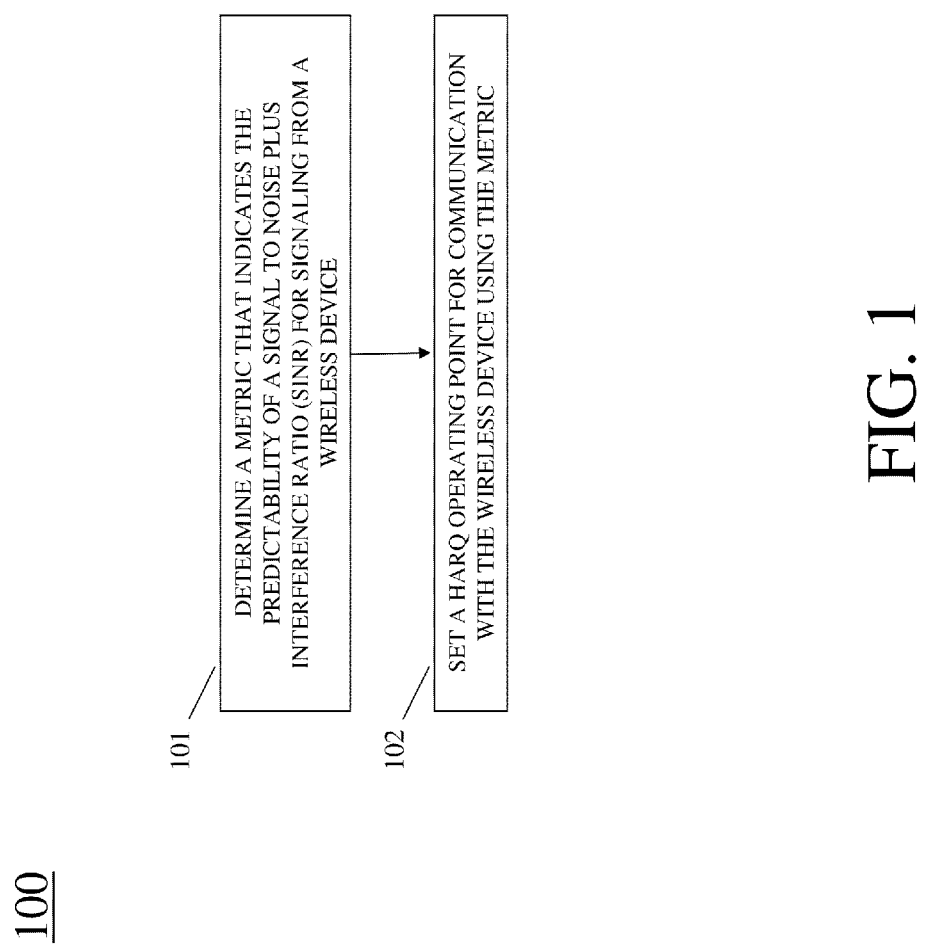
FIG. 1 is a logic flow diagram of functionality performed in setting a hybrid automatic repeat request (HARQ) operating point, in accordance with various embodiments of the present invention.

Specific embodiments of the present invention are disclosed below with reference to FIGS. 1-6. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods are provided to address some of the current issues in establishing and adapting an HARQ operating point. One method includes determining a metric that indicates the predictability of a signal to noise plus interference ratio (SINR) for signaling from a wireless device and setting a hybrid automatic repeat request (HARQ) operating point for communication with the wireless device using the metric. An article of manufacture is also provided, the article comprising a processor-readable storage medium storing one or more software programs which when executed by one or more processors performs the steps of this method.

Many embodiments are provided in which the method above is modified. Some embodiments further include receiving a first signal from a wireless device, predicting, using the received first signal, an estimated SINR for a second signal to be transmitted by the wireless device, and determining an actual SINR for the second signal when the second signal is received from the wireless device. In some embodiments, the received first signal comprises a sounding reference signal (SRS) and/or the second signal is received from the wireless device via a physical uplink shared channel (PUSCH).

In some embodiments, either additionally or alternatively, determining the metric that indicates the predictability of a SINR for signaling from the wireless device comprises determining a correlation metric using the estimated SINR and the actual SINR. In some embodiments, either additionally or alternatively, setting the HARQ operating point comprises determining the HARQ operating point based on the correlation metric. Furthermore, in some embodiments, either additionally or alternatively, determining the HARQ operating point comprises determining the HARQ operating point such that less HARQ transmissions are configured when the correlation metric is above a first threshold than when the correlation metric is below a second threshold, wherein the first threshold is greater than or equal to the second threshold.

A transceiver node apparatus is also provided. The transceiver node being configured to communicate with other devices in the system and being operative to determine a metric that indicates the predictability of a signal to noise plus interference ratio (SINR) for signaling from a wireless device and to set a hybrid automatic repeat request (HARQ) operating point for communication with the wireless device using the metric.

DETAILED DESCRIPTION OF EMBODIMENTS

To provide a greater degree of detail in making and using various aspects of the present invention, a description of our approach to HARQ operating point adaptation and a description of certain, quite specific, embodiments follows for the sake of example. FIGS. 3-6 are referenced in an attempt to illustrate some examples of specific embodiments of the present invention and/or how some specific embodiments may operate/perform.

To overcome the limitations of the existing approaches, it is proposed that a single metric be used which is indicative of how well the base station scheduler can predict the SINR of the mobile, as the SINR is the quantity which is indicative of the throughput the mobile can achieve. This metric should reflect different mobile speeds/Dopplers as well as different SRS periods, and variability in the other cell interference (which is not captured in present-day techniques).

For 3GPP LTE embodiments, a metric is proposed that can be calculated in the base station scheduler which can be used to quantify the predictability of the channel in the LTE uplink, and this can be used to configure an appropriate HARQ operating point. This metric will be based on the predicted SINR from the sounding reference signal (SRS) and the actual SINR experienced by mobile transmissions on the physical uplink shared channel (PUSCH).

Thus, in 3GPP LTE embodiments, the base station scheduler first computes the predicted SINR per physical resource block (PRB) based on the SRS, and uses this information to decide which mobiles to schedule and which PRBs to assign them. When the mobiles actually transmit on the physical uplink shared channel (PUSCH), the base station scheduler has available to it the actual SINR that was experienced at the base station receiver for each mobile over the PRBs on which it was scheduled.

It is proposed that the base station scheduler compute the correlation between the SINR it predicted based on the SRS and the actual SINR experienced on the PUSCH when the mobile transmitted. Denote $\text{SINR}^{SRS}(n,p)$ as the SINR that was estimated based on the SRS for PRB p in subframe n (which is time index), and denote $\text{SINR}^{PUSCH}(n, p)$ as the SINR that was actually experienced by the mobile on the PUSCH when it transmitted on PRB p in subframe n. The correlation metric is calculated as:

$$R = \frac{N\sum(\text{SINR}^{SRS}(n, p)\text{SINR}^{PUSCH}(n, p)) - \sum\text{SINR}^{SRS}(n, p)\sum\text{SINR}^{PUSCH}(n, p)}{\sqrt{N\sum(\text{SINR}^{SRS}(n, p))^2 - (\sum\text{SINR}^{SRS}(n, p))^2}\sqrt{N\sum(\text{SINR}^{PUSCH}(n, p))^2 - (\sum\text{SINR}^{PUSCH}(n, p))^2}}$$

where N is the number of PRBs times the number of subframes over which the correlation metric is calculated. It is proposed that this correlation metric be computed every time we collect a total of N samples across subframes and PRBs, where N should be a sufficiently large number in order to estimate the correlation accurately; a value of at least N=100 is recommended.

The procedure would then be to wait until we collect N samples of the PUSCH SINR for each UE (across PRBs and subframes), and then compute the correlation between the PUSCH SINR samples with the corresponding SRS SINR samples. Based on the value of this correlation coefficient, we will select the appropriate HARQ operating point. A high correlation means the base station scheduler is accurately able to predict the PUSCH SINR from the SRS SINR, and hence a relatively small number of HARQ transmissions should be configured. On the other hand, a low correlation means the SRS SINR is not reflecting the actual SINR on the PUSCH, and hence a relatively high number of HARQ transmissions should be configured.

The correlation metric can be computed over distinct block of N samples, or a sliding window approach can be used where the correlation metric is computed over overlapping blocks of N samples. Because we are computing the correlation between the predicted and actual SINR directly, this will overcome the deficiencies in existing techniques which do not account for unpredictable variations in the interference level. In addition, we do not need to store many different cases based on different SRS periods, the correlation metric we propose will automatically become smaller the longer the SRS period is for a given mobile speed, as we will see in the simulation results below.

FIGS. 3-6 illustrate the uplink system performance in terms of the overall sector throughput for mobile velocities of 1 km/hr (near stationary, laptop users), 3 km/hr (pedestrian users), 30 km/hr (urban vehicular speeds), and 120 km/hr (highway vehicular speeds). Performance is given for two different HARQ operating points and for a range of SRS periods. One HARQ operating point targets a relatively low number of HARQ transmissions by configuring a 20% error rate on the initial transmission, which is typical operating point which works well at low mobile speeds and for frequent SRS transmissions when the base station scheduler can accurately predict the channel state of the mobile. The other HARQ operating point targets a larger number of HARQ transmissions by configuring a 1% error rate should be reached after the maximum number of transmissions, which in this case is set to 5 transmissions; this is a typical HARQ operating point when the mobile speed is high and/or the SRS is transmitted less frequently, in which case the base station scheduler cannot accurately predict the channel state of the mobile. The simulation result is provided for the Extended Typical Urban fast fading profile and with 8 mobiles per sector using a proportional fair scheduling algorithm. All results are for a 1.7 GHz uplink carrier frequency corresponding to the AWS frequency band in North America.

Also shown on FIGS. 3-6 is the correlation metric we propose to use, where the correlation metric is computed over non-overlapping blocks of N=200 samples. The following observations can be made:

First, the best HARQ operating point depends on both the mobile speed as well as the SRS period. For a given SRS period, the best HARQ operating point depends on the mobile speed. For example, a 20% initial BLER operating point is best to use with an SRS period less than 15 ms if the mobile speed is 1 km/hr, but at 3 km/hr this HARQ operating point should only be used if the SRS period is less than 7 ms. For mobile speeds of 30 km/hr and 120 km/hr, using the HARQ operating point of targeting a 1% post-HARQ BLER is always the best one to use.

Figure 3:
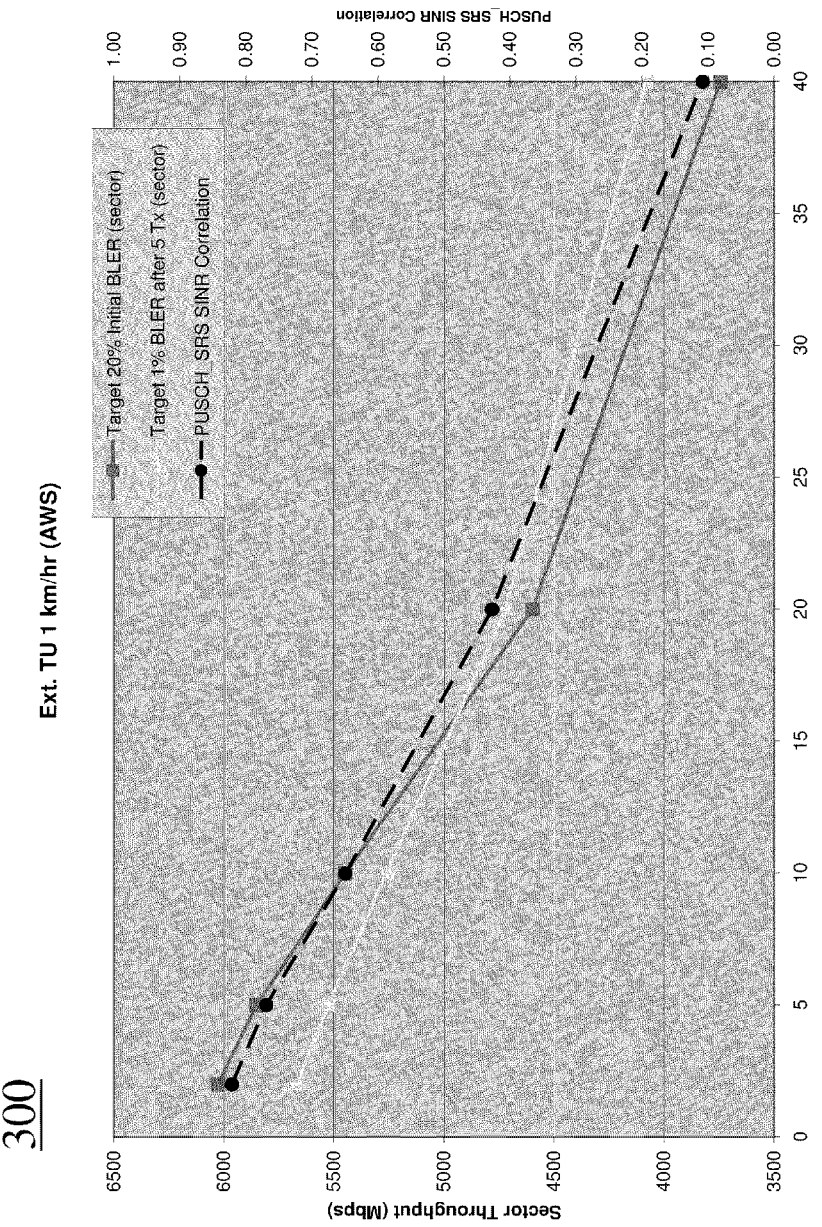
FIG. 3 is a graph depicting throughput performance for a mobile speed of 1 km/hr, in accordance with various embodiments of the present invention.
Figure 4:
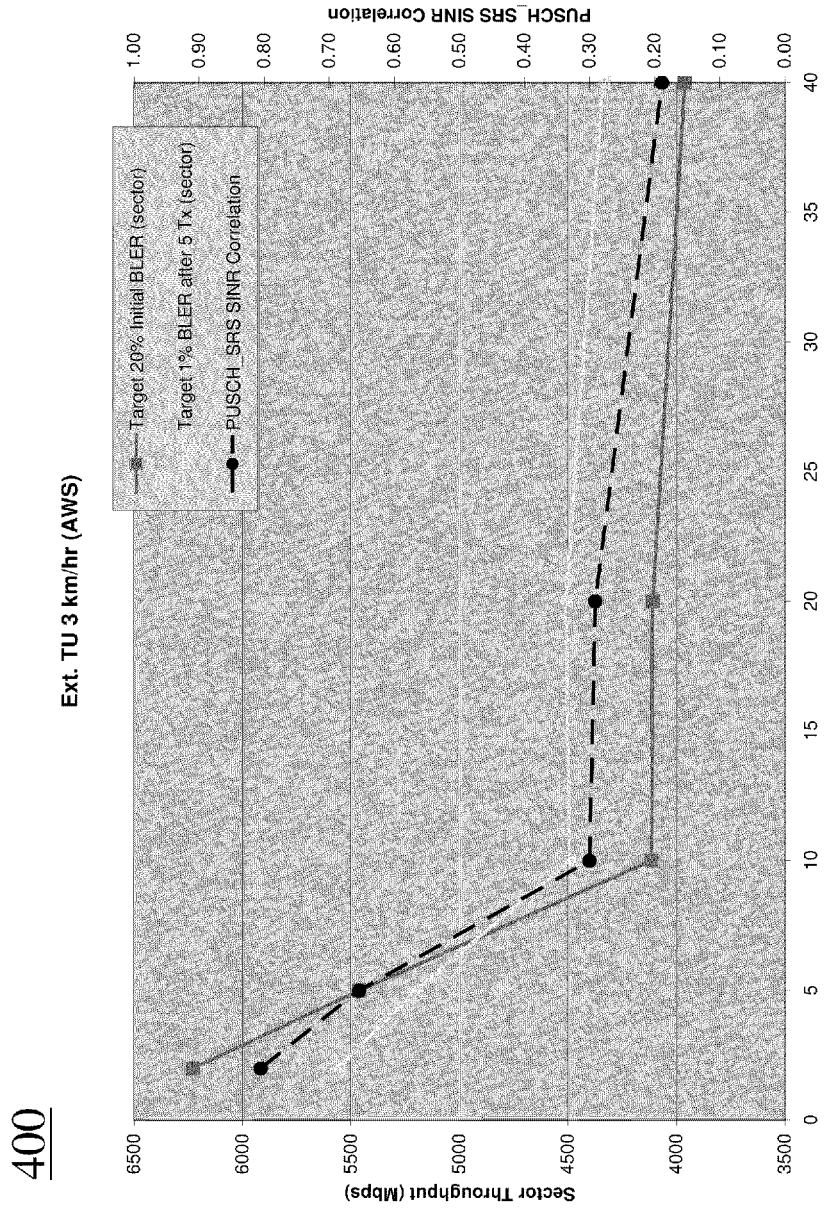
FIG. 4 is a graph depicting throughput performance for a mobile speed of 3 km/hr, in accordance with various embodiments of the present invention.
Figure 5:
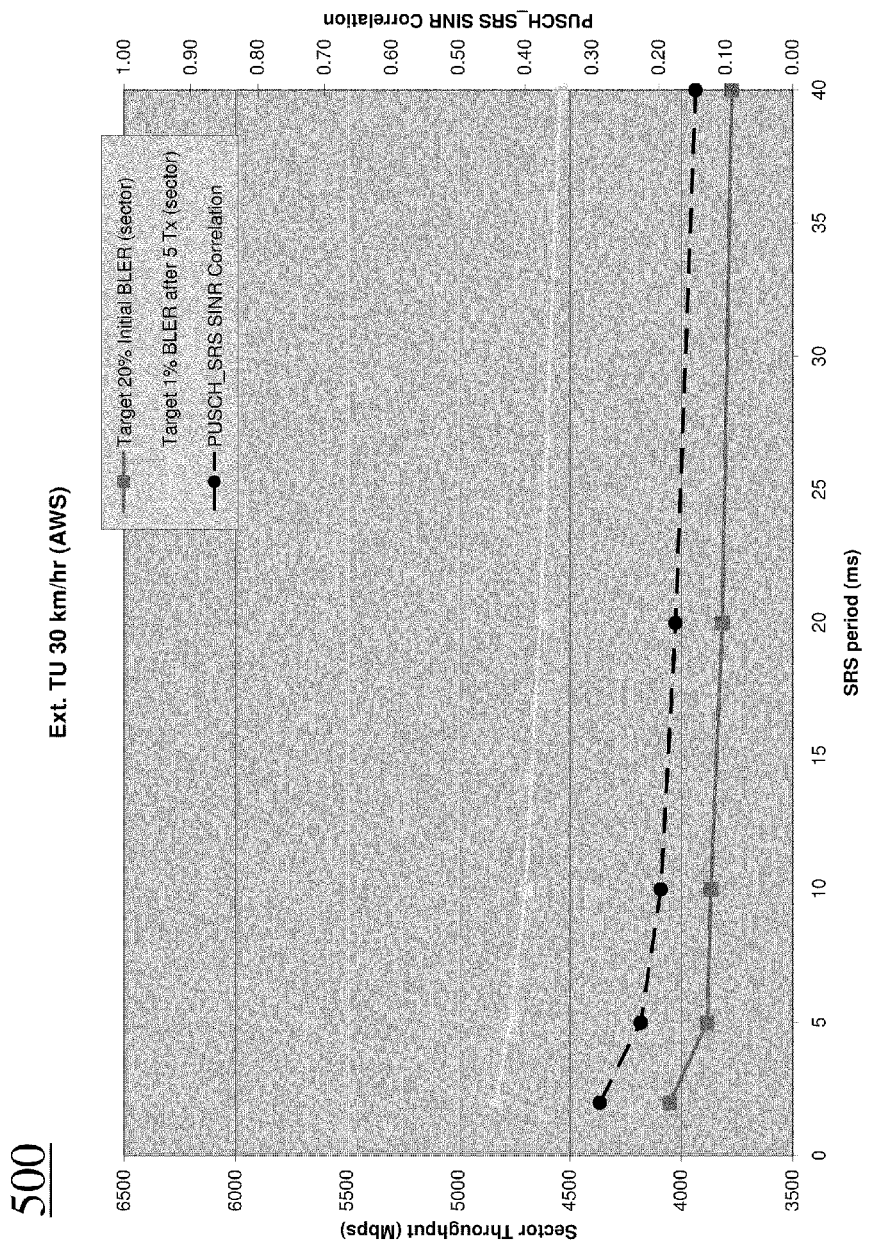
FIG. 5 is a graph depicting throughput performance for a mobile speed of 30 km/hr, in accordance with various embodiments of the present invention.
Figure 6:
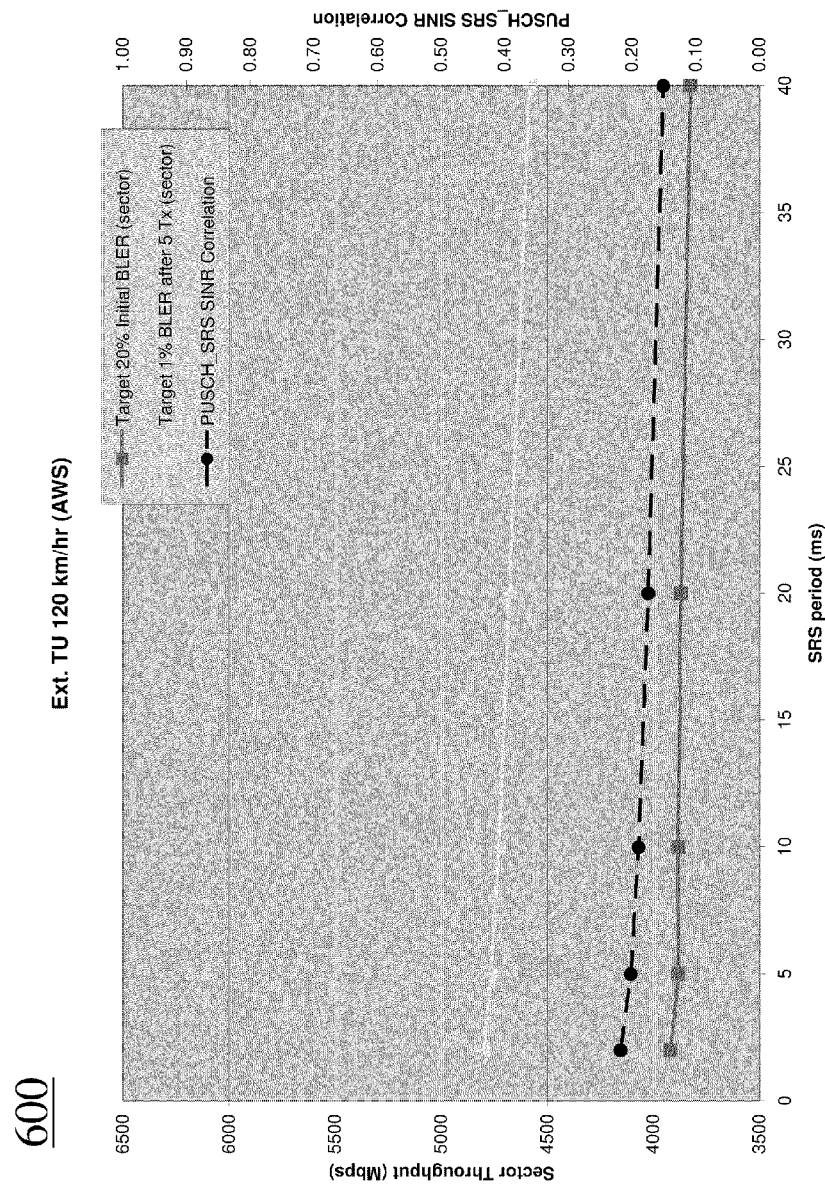
FIG. 6 is a graph depicting throughput performance for a mobile speed of 120 km/hr, in accordance with various embodiments of the present invention.

Second, looking at FIGS. 3 and 4 where we see a cross over in performance between the two HARQ operating points, it is observed that the correlation metric at this cross over point occurs at a value of approximately 0.48.

Based on these observations, a method to adapt the HARQ operating point would be as follows: Every time a new correlation metric is generated, compare it to a threshold (for example a value of 0.48). If the correlation metric is above this threshold, configure an HARQ operating point which uses a smaller number of transmissions (e.g. 20% initial BLER). If the correlation metric is below this threshold, configure an HARQ operating point which uses a larger number of HARQ transmissions (e.g. target 1% BLER after the final HARQ transmission).

This is of course easily generalized to the case of having more than 2 HARQ operating points and hence more than one threshold, although simulation results seem to suggest that using just 2 HARQ operating points and one threshold is sufficient. In addition, to avoid a "ping-pong" effect where we keep toggling between two different HARQ operating points, it is proposed to utilize a hysteresis technique where by two thresholds are configured for each potential switching point. For example, when we have 2 HARQ operating points as in the example above, instead of a single correlation metric threshold of 0.48, we would have a threshold of $0.48+\Delta_1$ and another threshold of $0.48-\Delta_2$, where $\Delta_1$ and $\Delta_2$ are design parameters (an example would be $\Delta_1=\Delta_2=0.05$). When using an HARQ operating point with fewer HARQ transmissions (such as the 20% initial BLER), we would only switch the HARQ operating point which utilizes more transmissions (such as targeting 1% BLER after the maximum number of transmissions) when the correlation metric falls below $0.48-\Delta_2$. Similarly, we would only switch the HARQ operating point from one which uses more HARQ transmissions to one which uses fewer HARQ transmissions when the correlatic metric goes above $0.48+\Delta_1$.

The detailed and, at times, very specific description above is provided to effectively enable a person of skill in the art to make, use, and best practice the present invention in view of what is already known in the art. In the examples, the present invention is described in the context of specific architectures, specific system configurations and specific wireless signaling technologies for the purpose of illustrating possible embodiments and a best mode for the present invention. Thus, the examples described should not be interpreted as restricting or limiting the scope of the broader inventive concepts.

Figure 2:
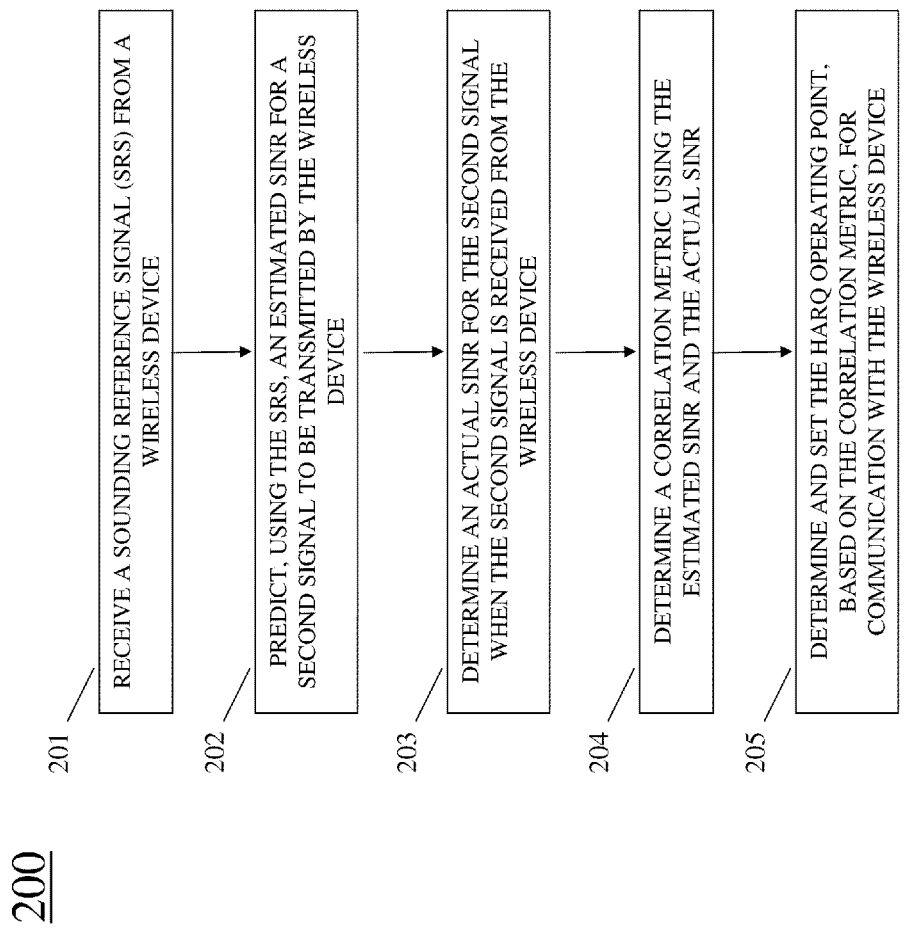
FIG. 2 is a logic flow diagram of functionality performed in setting an HARQ operating point, in accordance with some more detailed embodiments of the present invention.

Having described certain embodiments in detail above, a review of the more general aspects common to many of the embodiments of the present invention can be understood with reference to FIGS. 1-2. FIG. 1 is a logic flow diagram of functionality performed in setting a hybrid automatic repeat request (HARQ) operating point, in accordance with various embodiments of the present invention. In the method depicted in diagram 100, a metric is determined (101) that indicates the predictability of a signal to noise plus interference ratio (SINR) for signaling from a wireless device. A hybrid automatic repeat request (HARQ) operating point is then set (102) for communication with the wireless device using this metric. By setting the HARQ operating point based on a metric that indicates the predictability of SINR for wireless device signaling, throughput can be improved over present-day HARQ operating point adaptation techniques.

FIG. 2 is a logic flow diagram of functionality performed in setting an HARQ operating point, in accordance with some more detailed embodiments of the present invention. In the method depicted in diagram 200, a sounding reference signal (SRS) is received (201) from a wireless device. Using the SRS, an estimated SINR for a second signal to be transmitted by the wireless device is predicted (202). An actual SINR for the second signal is determined (203) when the second signal is received from the wireless device. A correlation metric is determined (204) using the estimated SINR and the actual SINR. This correlation metric is then used to determine and set (205) the HARQ operating point for communication with the wireless device.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method, comprising:
   determining a metric that indicates a predictability of a signal to noise plus interference ratio (SINR) for signaling from a wireless device;
   setting a hybrid automatic repeat request (HARQ) operating point for communication with the wireless device using the metric, wherein the method further comprises:
   receiving a first signal from the wireless device;
   predicting, using the received first signal, an estimated SINR for a second signal to be transmitted by the wireless device;
   determining an actual SINR for the second signal when the second signal is received from the wireless device.

2. The method as recited in claim 1, wherein the received first signal comprises a sounding reference signal (SRS) and wherein determining the actual SINR comprises determining the actual SINR for the second signal when the second signal is received from the wireless device via a physical uplink shared channel (PUSCH).

3. The method as recited in claim 1, wherein determining the metric that indicates the predictability of a SINR for signaling from the wireless device comprises
   determining a correlation metric using the estimated SINR and the actual SINR.

4. The method as recited in claim 3, wherein setting the HARQ operating point comprises determining the HARQ operating point based on the correlation metric.

5. The method as recited in claim 4, wherein determining the HARQ operating point comprises
   determining the HARQ operating point such that less HARQ transmissions are configured when the correlation metric is above a first threshold than when the correlation metric is below a second threshold, wherein the first threshold is greater than or equal to the second threshold.

6. An article of manufacture comprising a non-transitory processor-readable storage medium storing one or more software programs which when executed by one or more processors performs the steps of the method of claim 1.

7. A transceiver node of a communication system, the transceiver node being configured to communicate with other devices in the communication system, wherein the transceiver node is operative
   to determine a metric that indicates a predictability of a signal to noise plus interference ratio (SINR) for signaling from a wireless device, and
   to set a hybrid automatic repeat request (HARQ) operating point for communication with the wireless device using the metric, wherein the transceiver node is further operative
   to receive a first signal from the wireless device,
   to predict, using the received first signal, an estimated SINR for a second signal to be transmitted by the wireless device, and
   to determine an actual SINR for the second signal when the second signal is received from the wireless device.

8. The transceiver node as recited in claim 7, wherein the received first signal comprises a sounding reference signal (SRS) and
   wherein being operative to determine the actual SINR comprises being operative to determine the actual SINR for the second signal when the second signal is received from the wireless device via a physical uplink shared channel (PUSCH).

9. The transceiver node as recited in claim 7, wherein being operative to determine the metric that indicates a predictability of a SINR for signaling from the wireless device comprises
   being operative to determine a correlation metric using the estimated SINR and the actual SINR.

10. The transceiver node as recited in claim 9, wherein being operative to set the HARQ operating point comprises being operative to determine the HARQ operating point based on the correlation metric.

11. The transceiver node as recited in claim 10, wherein being operative to determine the HARQ operating point comprises
    being operative to determine the HARQ operating point such that less HARQ transmissions are configured when the correlation metric is above a first threshold than when the correlation metric is below a second threshold, wherein the first threshold is greater than or equal to the second threshold.

* * * * *